(12) United States Patent
Nakamura et al.

(10) Patent No.: US 9,480,128 B2
(45) Date of Patent: Oct. 25, 2016

(54) ILLUMINATION CONTROL METHOD AND ILLUMINATION CONTROL SYSTEM AND ILLUMINATION SYSTEM USING THE SAME

(71) Applicant: Panasonic Intellectual Property Management Co., Ltd., Osaka (JP)

(72) Inventors: Ryosuke Nakamura, Kanagawa (JP); Shinji Matsuda, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/928,497

(22) Filed: Oct. 30, 2015

(65) Prior Publication Data

US 2016/0128161 A1 May 5, 2016

(30) Foreign Application Priority Data

Oct. 30, 2014 (JP) .................................. 2014-221852

(51) Int. Cl.
*H05B 37/02* (2006.01)

(52) U.S. Cl.
CPC ...... *H05B 37/0218* (2013.01); *H05B 37/0227* (2013.01)

(58) Field of Classification Search
CPC .......... H05B 37/0227; H05B 37/0218; Y02B 20/46
USPC ................................................. 315/155, 291
See application file for complete search history.

(56) References Cited

U.S. PATENT DOCUMENTS

| 7,122,976 B1* | 10/2006 | Null | H05B 37/0218 315/294 |
|---|---|---|---|
| 2010/0176733 A1* | 7/2010 | King | H05B 37/0245 315/158 |
| 2012/0206050 A1* | 8/2012 | Spero | B60Q 1/04 315/152 |
| 2013/0074384 A1* | 3/2013 | Fenkart | H05B 37/0218 40/541 |
| 2014/0152188 A1* | 6/2014 | Bora | H05B 33/0863 315/210 |
| 2014/0265875 A1* | 9/2014 | Nelson | H05B 37/0245 315/153 |
| 2014/0312782 A1* | 10/2014 | Manor | H05B 37/02 315/155 |

FOREIGN PATENT DOCUMENTS

JP 2014-102909 6/2014

\* cited by examiner

*Primary Examiner* — Don Le
(74) *Attorney, Agent, or Firm* — Renner, Otto, Boisselle & Sklar, LLP (57) ABSTRACT

An illumination control system includes a first type illumination controller which detects presence of a person in an illumination space to be illuminated by an illumination apparatus, the illumination apparatus being connectable to the first type illumination controller, and a second type illumination controller which detects brightness in the illumination space, the second type illumination controller being connected to the first type illumination controller. The second type illumination controller derives a degree of dimming based on the detected brightness, and notifies the degree of dimming to the first type illumination controller. Upon detecting the presence of a person, the first type illumination controller controls dimming of the illumination apparatus according to the degree of dimming notified from the second type illumination controller.

8 Claims, 8 Drawing Sheets

ILLUMINATION CONTROL METHOD AND ILLUMINATION CONTROL SYSTEM AND ILLUMINATION SYSTEM USING THE SAME

CROSS-REFERENCE TO RELATED APPLICATIONS

This application claims priority to Japanese Patent Application No. 2014-221852 filed on Oct. 30, 2014, the entire contents of which are incorporated herein by reference

TECHNICAL FIELD

The present disclosure relates to illumination control technology, and more particularly to an illumination control method for controlling the illumination of illumination apparatuses and an illumination control system and an illumination system using the same.

BACKGROUND ART

An illumination control system has been known which is configured so as to turn on an illumination apparatus when it is determined that a person is present in an illumination space based on an image captured by an image sensor. An illumination controller included in the illumination control system switches the mode between a first mode in which the presence or absence of a person in the illuminated space is detected by using the image sensor and a second mode in which the brightness of the illumination space is detected by using the image sensor. Therefore, in the first mode, the illumination controller changes an ON/OFF state of the illumination apparatus if the presence of a person is detected, and in the second mode, the illumination controller controls the dimming of the illumination apparatus such that an average luminance value of the captured image falls within in a target range (see, e.g., Japanese Unexamined Patent Application Publication No. 2014-102909).

The illumination controller performs both the detection of the presence of a person and the detection of the brightness by using the image sensor. However, in each case, the setting of the image sensor is different. In the case of detecting the presence of a person, an amplification factor is controlled adaptively in order for the captured image to have optimal brightness. However, in the case of detecting the brightness, the amplification factor is fixed in order to detect the brightness itself of the captured image. Therefore, the detection of the presence of a person and the detection of the brightness are not performed at the same time.

SUMMARY OF THE INVENTION

In view of the above, the present disclosure provides an illumination control method for executing the detection of the presence of a person and the detection of the brightness at an arbitrary timing and an illumination control system using the same.

According to one aspect of the present disclosure, there is provided an illumination control system including a first type illumination controller which detects presence of a person in an illumination space to be illuminated by an illumination apparatus, the illumination apparatus being connectable to the first type illumination controller, and a second type illumination controller which detects brightness in the illumination space, the second type illumination controller being connected to the first type illumination controller. The second type illumination controller derives a degree of dimming based on the detected brightness, and notifies the degree of dimming to the first type illumination controller. Upon detecting the presence of a person, the first type illumination controller controls dimming of the illumination apparatus according to the degree of dimming notified from the second type illumination controller.

According to another aspect of the present disclosure, there is provided an illumination system including an illumination apparatus, a first type illumination controller which detects presence of a person in an illumination space to be illuminated by an illumination apparatus, the illumination apparatus being connectable to the first type illumination controller, and a second type illumination controller which detects brightness in the illumination space, the second type illumination controller being connected to the first type illumination controller. The second type illumination controller derives a degree of dimming based on the detected brightness, and notifies the degree of dimming to the first type illumination controller. Upon detecting the presence of a person, the first type illumination controller controls dimming of the illumination apparatus according to the degree of dimming notified from the second type illumination controller.

According to still another aspect of the present disclosure, there is provided an illumination control method, which is performed in an illumination control system including a first type illumination controller connectable to an illumination apparatus and a second type illumination controller connected to the first type illumination controller, the method including allowing the second type illumination controller to detect brightness in an illumination space to be illuminated by the illumination apparatus and derive a degree of dimming based on the detected brightness, allowing the second type illumination controller to notify the derived degree of dimming to the first type illumination controller, and allowing the first type illumination controller to control dimming of the illumination apparatus according to the degree of dimming notified from the second type illumination controller upon detecting presence of a person in the illumination space.

Further, arbitrary combinations of the aforementioned constituent elements and expressions of the present disclosure may be converted into a method, an apparatus, a system, a recording medium, and a computer program, which are effective as embodiments of the present disclosure.

According to the present disclosure, it is possible to perform the detection of the presence of a person and the detection of the brightness at an arbitrary timing.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

First Embodiment

Before describing the first embodiment of the present invention in detail, a description will be given of the fundamental findings.

The first embodiment of the present invention relates to an illumination system for controlling the illumination of multiple illumination apparatuses depending on whether a person is present and ambient brightness. The illumination system is used, for example, in an office, and the multiple illumination apparatuses are ceiling lights attached to the ceiling. As described above, the detection of the presence of a person and the detection of the brightness are based on an image captured by an image sensor. Meanwhile, an image for detecting the presence of a person and an image for detecting the brightness are captured while changing the setting of the image sensor. Thus, only an image for either detection can be captured at a predetermined timing, and the detection of the presence of a person and the detection of the brightness cannot be performed at the same time. This means that these processes cannot be performed at an arbitrary timing.

Further, the illumination system may be used for various purposes without being limited thereto.

However, in order to control the illumination system to be suitable for the actual environment, it is preferable that the detection of the presence of a person and the detection of the brightness are performed at an arbitrary timing. To realize this end, in the first embodiment, an illumination controller for detecting the presence of a person and an illumination controller for detecting the brightness are configured separately. Since each illumination controller performs a single process, the process is performed at an arbitrary timing while preventing the configuration from being complicated.

Figure 1:
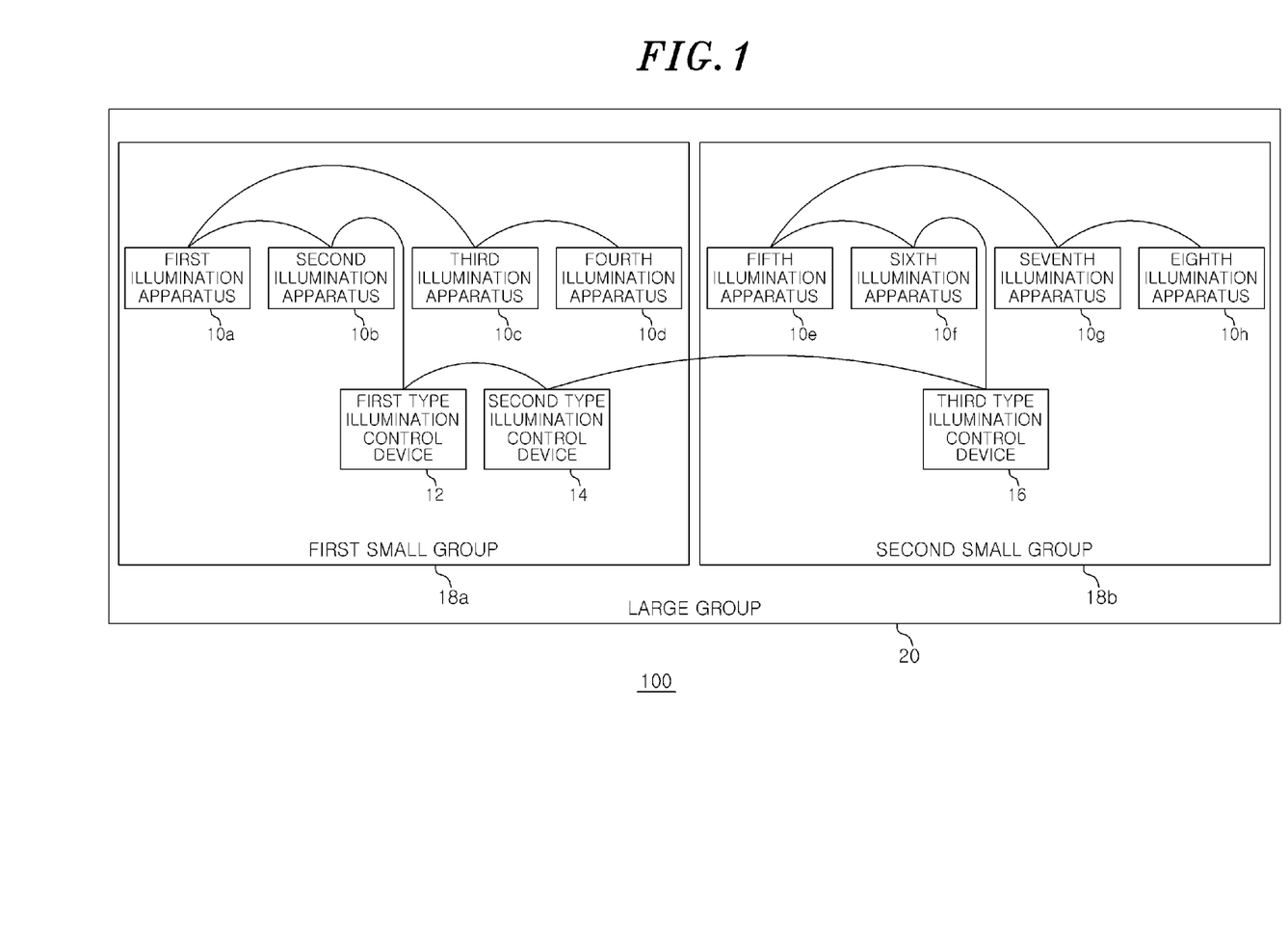
FIG. 1 shows a configuration of an illumination system according to one embodiment of the present invention.

FIG. 1 shows a configuration of an illumination system 100 according to the first embodiment of the present invention. The illumination system 100 includes a first illumination apparatus 10a, a second illumination apparatus 10b, a third illumination apparatus 10c, a fourth illumination apparatus 10d, a fifth illumination apparatus 10e, a sixth illumination apparatus 10f, a seventh illumination apparatus 10g, an eighth illumination apparatus 10h, which are collectively referred to as illumination apparatuses 10, a first type illumination controller 12, a second type illumination controller 14, and a third type illumination controller 16. Further, a first small group 18a consists of the first illumination apparatus 10a, the second illumination apparatus 10b, the third illumination apparatus 10c, the fourth illumination apparatus 10d, the first type illumination controller 12 and the second type illumination controller 14. A second small group 18b consists of the fifth illumination apparatus 10e, the sixth illumination apparatus 10f, the seventh illumination apparatus 10g, the eighth illumination apparatus 10h, and the third type illumination controller 16. The first small group 18a and the second small group 18b are collectively referred to as small groups 18. Further, a large group 20 consists of the first small group 18a and the second small group 18b.

The illumination apparatuses 10 are equivalent to the ceiling lights described above to illuminate an illumination space. The illumination apparatuses 10, e.g., the first illumination apparatus 10a to the fourth illumination apparatus 10d, included in one small group 18 are daisy-chain connected by dimming signal lines. The illumination space may indicate a space to be illuminated by one illumination apparatus 10, but may also indicate a space to be illuminated by a combination of the multiple illumination apparatuses 10 included in one small group 18. In the following description, the same term "illumination space" is used in both cases.

The first type illumination controller 12 can be connected to illumination apparatus 10. In this case, the first type illumination controller 12 is connected to one illumination apparatus 10, e.g., the second illumination apparatus 10b. The connection between the illumination apparatus 10 and the first type illumination controller 12 is also achieved by using the dimming signal line. The first type illumination controller 12 detects the presence of a person in the illumination space, and controls the illumination of the illumination apparatuses 10 which are daisy-chain connected. The detection of the presence of a person and the control of dimming will be described later.

The second type illumination controller 14 is connected to the first type illumination controller 12 via a control signal line. Further, since the dimming signal line is not connected to the second type illumination controller 14, the second type illumination controller 14 is not connected to the illumination apparatuses 10. The second type illumination controller 14 is installed in the vicinity of the first type illumination controller 12, and is paired with the first type illumination controller 12. Pairing is achieved by sending the address of the second type illumination controller 14, which is intended to be paired with the first type illumination controller 12, to the first type illumination controller 12 by using a remote control, or in the opposite way, by sending the address of the first type illumination controller 12 to the second type illumination controller 14 by using a remote control. Alternatively, pairing may be achieved by using a short-range wireless communication system allowing the first type illumination controller 12 and the second type illumination controller 14 to exchange information with each other.

The second type illumination controller 14 detects the brightness in the illumination space. In this case, the illumination space is substantially the same as the illumination space on which detection is performed by the first type illumination controller 12. Hereinafter, in order to facilitate the explanation, the illumination spaces on which both detections are performed are assumed to be identical to each other. The second type illumination controller 14 determines the correction amount such that the illuminance of the illumination space is substantially constant based on the detected brightness, e.g., the amount of external light, and transmits the correction amount to the first type illumination controller 12. This process will be described later.

The third type illumination controller 16 may be connected to the other illumination apparatus 10 different from the illumination apparatus 10 that can be connected to the first type illumination controller 12. In this case, the third type illumination controller 16 is connected to the sixth illumination apparatus 10f. The third type illumination controller 16 performs the same process as the first type illumination controller 12 in the second small group 18b, and detects the presence of a person in the other illumination space to be illuminated by the other illumination apparatuses 10 included in the second group 18b. Unlike the first type illumination controller 12, the third type illumination controller 16 is not paired with the second type illumination controller 14, but is connected to the second type illumination controller 14 via a control signal line. Therefore, the third type illumination controller 16 receives the correction amount from the second type illumination controller 14 and controls the dimming of the other illumination apparatuses 10 which are daisy-chain connected. In the illumination system 100, the first type illumination controller 12 and the second type illumination controller 14, or the first type illumination controller 12, the second type illumination controller 14 and the third type illumination controller 16 may also be referred to as an illumination control system.

Figure 2:
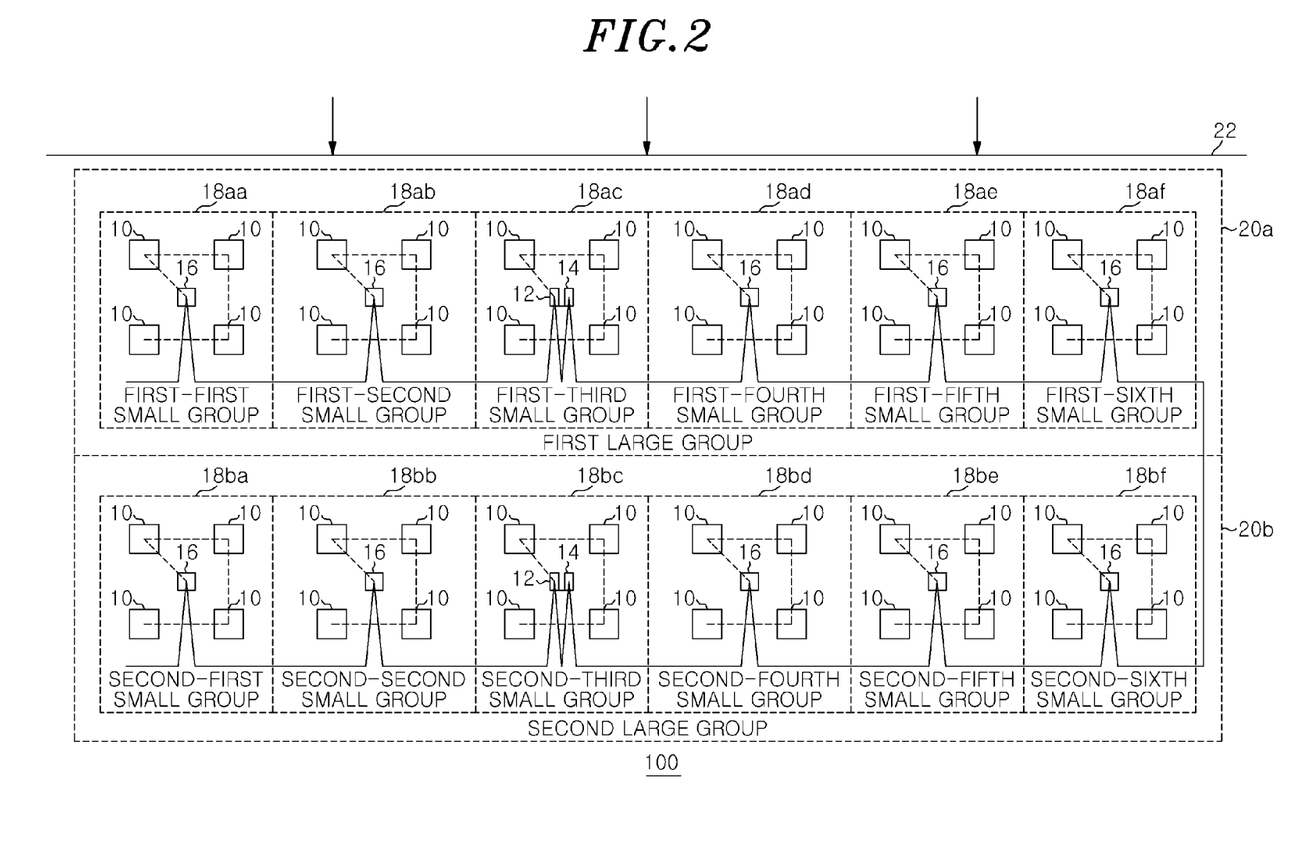
FIG. 2 shows another configuration of the illumination system according to the embodiment of the present invention.

FIG. 2 shows another configuration of the illumination system 100 according to the first embodiment of the present invention. This corresponds to a configuration when the illumination system 100 shown in FIG. 1 is deployed in an actual office, and shows the arrangement viewed from the ceiling surface. Since an external light window 22 is disposed on the top side of the figure, external light is incident in a direction from top to bottom on the figure. Therefore, a first large group 20a and a second large group 20b are set according to the distance from the external light window 22, i.e., depending on the degree of influence of the amount of external light. Specifically, the amount of external light in the first large group 20a tends to be larger than the second large group 20b. Each of the first large group 20a and the second large group 20b corresponds to the large group 20 of FIG. 1. The first large group 20a includes a first-first small group 18aa, a first-second small group 18ab, a first-third small group 18ac, a first-fourth small group 18ad, a first-fifth small group 18ae, and a first-sixth small group 18af. Further, the second large group 20b includes a second-first small group 18ba, a second-second small group 18bb, a second-third small group 18bc, a second-fourth small group 18bd, a second-fifth small group 18be, and a second-sixth small group 18bf.

In this case, each of the first-third small group 18ac and the second-third small group 18bc includes the first type illumination controller 12 and the second type illumination controller 14, and corresponds to the first small group 18a of FIG. 1. Further, each of the other small groups 18 includes the third type illumination controller 16, and corresponds to the second small group 18b of FIG. 1. The four illumination apparatuses 10 and the first type illumination controller 12 or the third type illumination controller 16 included in each of the small groups 18 are connected by dimming signal lines represented by dashed lines. Further, the first type illumination controller 12, the second type illumination controller 14 and the third type illumination controller 16 are connected by control signal lines represented by solid lines. The first large group 20a and the second large group 20b are also connected to each other by control signal lines. However, in this embodiment, significant information is not transmitted between the first large group 20a and the second large group 20b. That is, processing is independently performed in each of the first large group 20a and the second large group 20b.

Figure 3:
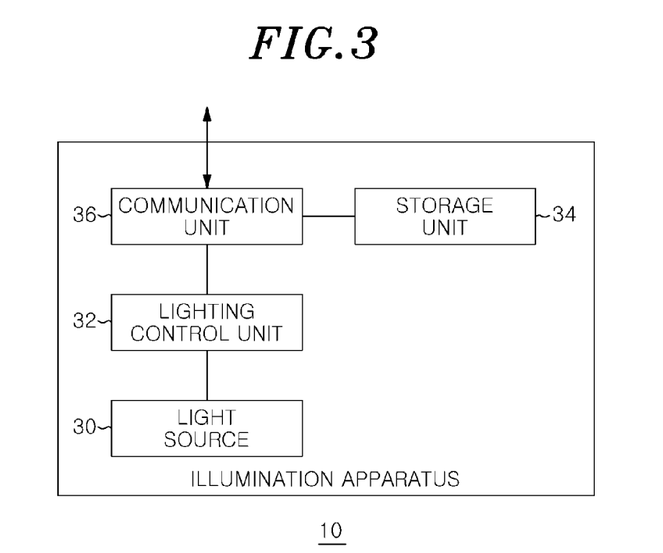
FIG. 3 shows a configuration of the illumination apparatus of FIG. 1.

FIG. 3 shows a configuration of the illumination apparatus 10. The illumination apparatus 10 includes a light source 30, a lighting control unit 32, a storage unit 34, and a communication unit 36. The light source 30 may be a light emitting diode (LED), a fluorescent lamp or the like. The light source 30 may be provided integrally with the illumination apparatus 10, and may be provided separately from the illumination apparatus 10. Also, the illumination apparatus 10 may be configured to have housings (not shown) and configured as a group of illumination apparatuses by providing the light source 30 in each housing.

The lighting control unit 32 controls a lighting state of the light source 30. The lighting control unit 32 performs ON/OFF switching control of the light source 30 and dimming control at an instructed dimming rate according to a control signal obtained by the communication unit 36 (which will be described later) from the first type illumination controller 12 or the third type illumination controller 16. That is, the lighting control unit 32 turns on the dimming of the light source 30 according to a dimming rate that is included in the control signal from the first type illumination controller 12 or the third type illumination controller 16. The dimming rate is a value representing a ratio of the brightness with respect to total lighting (100%), and can be adjusted in a range, e.g., from 5 to 100%. The storage unit 34 stores a unique address. The communication unit 36 is connected to the dimming signal line and performs communication with the first type illumination controller 12 or the third type illumination controller 16.

This configuration may be realized by a CPU, a memory, and other LSIs of an arbitrary computer in terms of hardware, and may be realized by a program loaded into a memory in terms of software, but FIG. 3 depicts the functional blocks realized by the hardware/software collaborations. Therefore, it can be understood by those skilled in the art that these functional blocks can be realized in various forms by not only hardware but also combinations of hardware and software.

Figure 4:
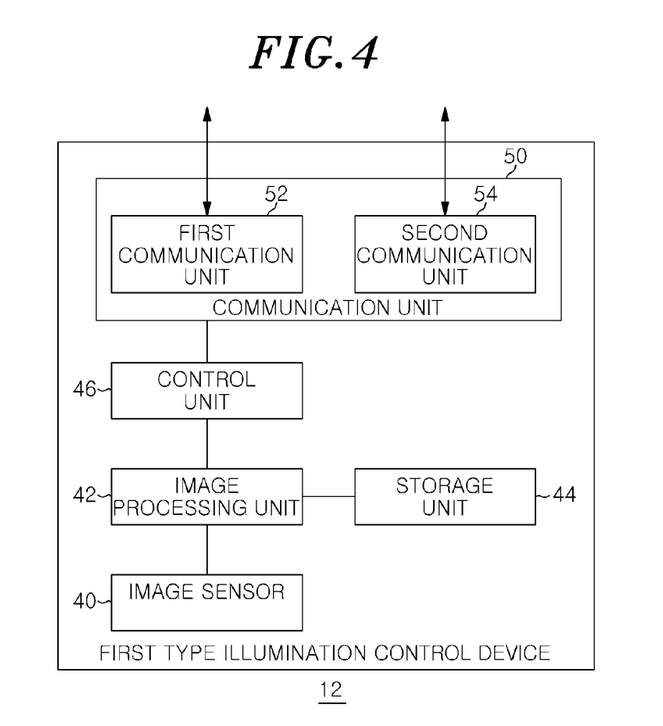
FIG. 4 shows a configuration of the first type illumination controller of FIG. 1.

FIG. 4 shows a configuration of the first type illumination controller 12. The first type illumination controller 12 includes an image sensor 40, an image processing unit 42, a storage unit 44, a control unit 46, and a communication unit 50. The communication unit 50 includes a first communication unit 52 and a second communication unit 54. Further, since the third type illumination controller 16 is also configured similarly to the first type illumination controller 12, a description thereof will be omitted.

The image sensor 40 has a solid-state image pickup device in which light receiving elements are arranged two-dimensionally, a converter for converting an output value of each of the light receiving elements from analog data into digital data, and an amplifier for amplifying the converted digital value. The solid-state image pickup device is, for example, a charge-coupled device (CCD), and a complementary metal oxide semiconductor (CMOS). Since each light receiving element corresponds to each pixel of the captured image, the output value of each light receiving element becomes the pixel value of the captured image. Therefore, as the amount of light received by the light receiving element increases, the pixel value of the corresponding pixel becomes larger.

Further, the image sensor 40 has an automatic gain control (AGC) circuit. The AGC circuit automatically adjusts an amplification factor of the amplifier such that a constant output is obtained from the amplifier even when an input of the amplifier varies. The amplification factor is a ratio of the average value of all the output values of the amplifier to the average value of the output values of all the light receiving elements. Therefore, even when the illumination space is relatively dark, since the AGC circuit increases the amplification factor, the image sensor 40 can ensure appropriate brightness of the captured image. Thus, the image sensor 40 generates a captured image of the illumination space in the solid-state image pickup device. Then, after the captured image is converted by the converter and amplified by the amplifier, it is outputted as image data of the captured image to the image processing unit 42.

The image processing unit 42 performs image processing, particularly, image processing for detecting the presence of a person, on the captured image from the image sensor 40. Prior to image processing, the image sensor 40 captures an image (hereinafter, referred to as "background image") in the illumination space in a state where a person is absent in the illumination space, and the storage unit 44 stores a captured background image. The image processing unit 42 generates a difference image by calculating the difference in pixel values between the newly captured image and the background image for each pixel. The sum of pixel values of the difference image when a person is present in the illumination space is greater than the sum of pixel values of the difference image when a person is absent in the illumination space. Therefore, the image processing unit 42 retains a threshold value, and determines that a person is present in the illumination space if the sum of the pixel values of the difference image is larger than the threshold value. On the other hand, the image processing unit 42 determines that a person is absent in the illumination space if the sum of the pixel values of the difference image is equal to or smaller than the threshold value. Further, the sum of the pixel values of the difference image to be compared with the threshold value may be the sum of the pixel values of the entire difference image, or may be the sum of the pixel values of a partial region of the difference image.

The first communication unit 52 is connected to the control signal line, and performs communication with the second type illumination controller 14. The communication with the second type illumination controller 14 may be performed directly, or may be performed indirectly through another controller such as the first type illumination controller 12 and the third type illumination controller 16. The second communication unit 54 is connected to the dimming signal line, and performs communication with the illumination apparatuses 10. The second communication unit 54 retains an address that is uniquely assigned to each of the illumination apparatuses 10, and specifies the illumination apparatus 10 that is a target for communication by using the address.

The control unit 46 controls an operation, particularly, dimming processing, of the first type illumination controller 12. In dimming processing, the illumination apparatuses 10 are controlled by executing the communication with the second type illumination controller 14 in the first communication unit 52, or by transmitting a control signal from the second communication unit 54 to the illumination apparatus 10. In this manner, the control unit 46 performs dimming control at an instructed dimming rate or ON/OFF switching control of the illumination apparatus 10 by transmitting a control signal.

With respect to the dimming processing, a process of two steps is defined in the second type illumination controller 14 and the third type illumination controller 16 in addition to the first type illumination controller 12. The first step is a preparation process, which corresponds to pre-processing for performing the dimming control. The second step is a control process, which corresponds to processing for actually controlling the dimming. The control unit 46 receives OFF and ON instructions from the second type illumination controller 14 through the first communication unit 52 in the preparation process. Upon receiving the OFF instruction, the control unit 46 transmits a control signal for instructing the illumination apparatus 10 to be turned off via the second communication unit 54. On the other hand, upon receiving the ON instruction, the control unit 46 transmits a control signal for instructing the illumination apparatus 10 to be turned on via the second communication unit 54. Also, in the case of receiving the ON instruction, the control unit 46 sends back a value of a dimming ratio of the illumination apparatus 10, which has been turned on, to the second type illumination controller 14 via the first communication unit 52. In this case, since the multiple illumination apparatuses 10 are controlled by the first type illumination controller 12, an average value (hereinafter, referred to as "average dimming rate") of the respective dimming ratios of the multiple illumination apparatuses 10 is sent back.

In the control process, the control unit 46 receives correction amount from the second type illumination controller 14 via the first communication unit 52. Further, the correction amount is derived by the second type illumination controller 14 to be described later, and is represented as an luminance value indicating the amount to be adjusted in order to approximate a current brightness level to a target brightness level. Meanwhile, the control unit 46 checks the determination result (i.e., whether a person has been detected) of the image processing unit 42.

Upon detecting the presence of a person, the control unit 46 derives the dimming rate of the illumination apparatuses 10 from the received correction amount. For example, the control unit 46 converts a unit of the correction amount from the luminance value to the dimming ratio, and increases or decreases the current dimming rate by the correction amount which has been converted into the dimming rate. Further, the control unit 46 has previously stored a table showing a relationship between the luminance value and the dimming rate, and uses this table for the conversion. Since the derived dimming rate is applied to the illumination apparatuses 10 which are connected to the first type illumination controller 12, it may be referred to as "average dimming rate." The control unit 46 simultaneously transmits control signals including the average dimming rate via the second communication unit 54 to the illumination apparatuses 10. Thus, the control unit 46 simultaneously controls the dimming rates of the illumination apparatuses 10 to approach the correction amount from the second type illumination controller 14 if a person is present. Further, the control unit 46 also transmits the average dimming rate via the first communication unit 52 to the second type illumination controller 14. Meanwhile, the control unit 46 simultaneously transmits control signals including the OFF instruction via the second communication unit 54 to the illumination apparatuses 10 if the presence of a person is not detected. Accordingly, the control unit 46 simultaneously turns off the illumination apparatuses 10 if a person is absent. The control unit 46 transmits the average dimming rate of "0%" corresponding to turn-off via the first communication unit 52 to the second type illumination controller 14. Further, the transmission of the average dimming rate to the second type illumination controller 14 may be made appropriately.

As described above, the third type illumination controller 16 also performs the same operation as the first type illumination controller 12. However, since the third type illumination controller 16 is not paired with the second type illumination controller 14, a process of transmitting a signal to the second type illumination controller 14 may be omitted.

Figure 5:
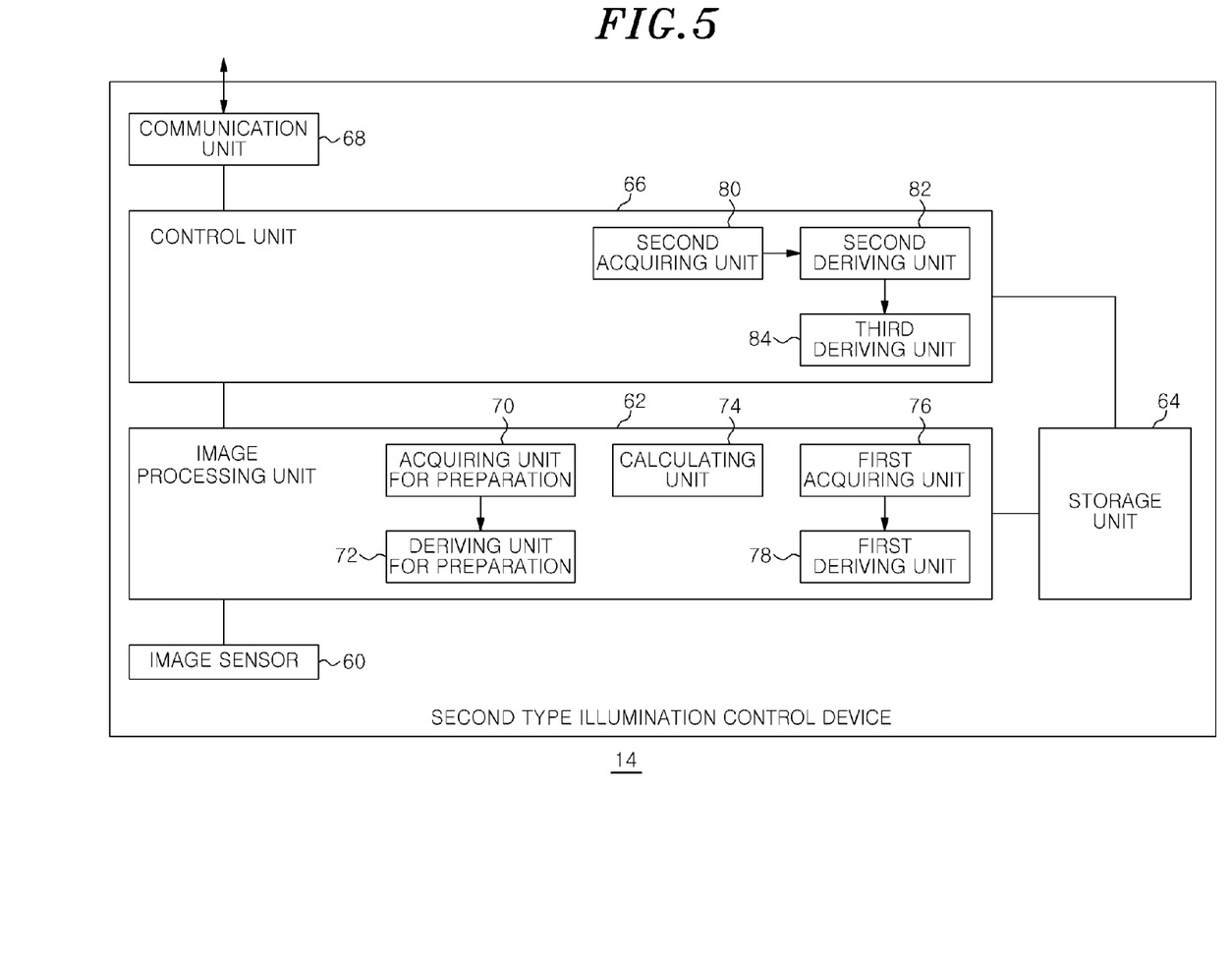
FIG. 5 shows a configuration of the second type illumination controller of FIG. 1.

FIG. 5 shows a configuration of the second type illumination controller 14. The second type illumination controller 14 includes an image sensor 60, an image processing unit 62, a storage unit 64, a control unit 66, and a communication unit 68. The image processing unit 62 includes an acquiring unit 70 for preparation, a deriving unit 72 for preparation, a calculating unit 74, a first acquiring unit 76 and a first deriving unit 78. The control unit 66 includes a second acquiring unit 80, a second deriving unit 82 and a third deriving unit 84.

The image sensor 60 is configured similarly to the image sensor 40 described above. However, since the image sensor 60 is used to detect the brightness of the illumination space in the image processing unit 62 to be described later, automatic adjustment of the amplification factor of the aforementioned AGC circuit is not performed, and the amplification factor of the amplifier becomes a fixed value. This is because it is impossible to detect the brightness of the illumination space from the captured image if the brightness of the captured image is adjusted by the AGC circuit. Therefore, the image sensor 60 may not include the AGC circuit, and the function of the AGC circuit may be turned off.

The communication unit 68 is connected to the control signal line and performs communication with the first type illumination controller 12. The communication unit 68 transmits a signal to the third type illumination controller 16 by using the control signal line.

Hereinafter, the image processing unit 62, the storage unit 64 and the control unit 66 will be described. However, for clarity of explanation, the preparation process and the control process will be described separately. First, the preparation process will be described. The preparation process is performed in the absence of external light. The control unit 66 transmits the OFF instruction to the first type illumination controller 12 and transmits the ON instruction to the third type illumination controller 16 via the communication unit 68. Accordingly, the control unit 66 turns off the illumination apparatuses 10 whose dimming is controlled by the first type illumination controller 12, and turns on the other illumination apparatuses 10 whose dimming is controlled by the third type illumination controller 16. This may be a situation where only the illumination apparatuses 10 of the small group 18 including the second type illumination controller 14 are turned off, and the other illumination apparatuses 10 are turned on.

In this situation, the image sensor 60 generates a captured image of the illumination space, and outputs the captured image as an captured preparation image to the acquiring unit 70 for preparation. The acquiring unit 70 for preparation acquires the captured preparation image from the image sensor 60. The deriving unit 72 for preparation calculates the average value of the pixel values of the pixels in the captured preparation image acquired by the acquiring unit 70 for preparation. The average value corresponds to an artificial light component due to the ambient illumination apparatuses 10, and has a unit of the luminance value. The deriving unit 72 for preparation stores an ambient artificial light component "A" in the storage unit 64.

Subsequently, the control unit 66 transmits the ON instruction to the first type illumination controller 12 and transmits the OFF instruction to the third type illumination controller 16 via the communication unit 68. Accordingly, the control unit 66 turns on the illumination apparatuses 10 whose dimming is controlled by the first type illumination controller 12, and turns off the other illumination apparatuses 10 whose dimming is controlled by the third type illumination controller 16. This may be a situation where only the illumination apparatuses 10 of the small group 18 including the second type illumination controller 14 are turned on, and the other illumination apparatuses 10 are turned off. Further, in response to the ON instruction to the first type illumination controller 12, the control unit receives the average dimming rate from the first type illumination controller 12 via the communication unit 68. The control unit 66 outputs the average dimming rate to the calculating unit 74.

In this situation, the image sensor 60 generates a captured image of the illumination space, and outputs the captured image to the calculating unit 74. The calculating unit 74 acquires the captured image from the image sensor 60, and calculates the average value of the pixel values of the pixels in the acquired captured image. The average value may be an average luminance value. Meanwhile, the calculating unit 74 receives the average dimming rate from the control unit 66. The calculating unit 74 derives a variation of the luminance value (hereinafter referred to as "luminance variation") when the dimming ratio of the illumination apparatuses 10 is varied by 1% by dividing the average luminance value by the average dimming rate. For example, if the average luminance value is "200" and the average dimming rate is "100%", luminance variation "B" becomes "2". The calculating unit 74 stores the derived luminance variation "B" in the storage unit 64.

After the preparation process has been performed, the control process is performed in the presence of external light. The image sensor 60 generates a captured image of the illumination space, and outputs the captured image to the first acquiring unit 76. The first acquiring unit 76 acquires the captured image from the image sensor 60. The first deriving unit 78 calculates the average value of the pixel values of the pixels in the captured image acquired by the first acquiring unit 76. The average value is equivalent to the brightness in the illumination space, and has a unit of the luminance value. The first deriving unit 78 outputs brightness "C" in the illumination space to the second deriving unit 82.

The second acquiring unit 80 receives the average dimming rate from the first type illumination controller 12 via the communication unit 68. This is an average value of the dimming rate of the illumination apparatuses 10 whose dimming is controlled by the first type illumination controller 12. The second acquiring unit 80 outputs average dimming rate "D" to the second deriving unit 82. The second deriving unit 82 receives the average dimming rate "D" from the second acquiring unit 80, and receives the brightness "C" in the illumination space from the first deriving unit 78. Further, the second deriving unit 82 extracts the ambient artificial light component "A" and the luminance variation "B" from the storage unit 64. The second deriving unit 82 derives external light component "E" by multiplying the luminance variation "B" by the average dimming rate "D" and subtracting the multiplication result and the ambient artificial light component "A" from the brightness "C" in the illumination space. That is, the second deriving unit 82 performs the following processing:

$$E = C - B \times D - A$$

where the external light component "E" has a unit of the luminance value. The second deriving unit 82 outputs the external light component "E" to the third deriving unit 84.

In order for the external light component "E" from the second deriving unit 82 to approach target value "F," the third deriving unit 84 derives correction amount "G" as follows:

$$G = F - E$$

By applying the correction amount "G," if the external light component "E" is lower than the target value "F," the dimming rate of the illumination apparatuses 10 increases, and if the external light component "E" is greater than the target value "F," the dimming rate of the illumination apparatuses 10 decreases.

The control unit 66 transmits the correction amount to the first type illumination controller 12 and the third type illumination controller 16 via the communication unit 68. In a case where the first type illumination controller 12 and the third type illumination controller 16 to which the correction amount is transmitted are specified, the control unit 66 may transmit the correction amount only to the corresponding controller by using the address that is uniquely assigned to the specified controller.

Figure 6:
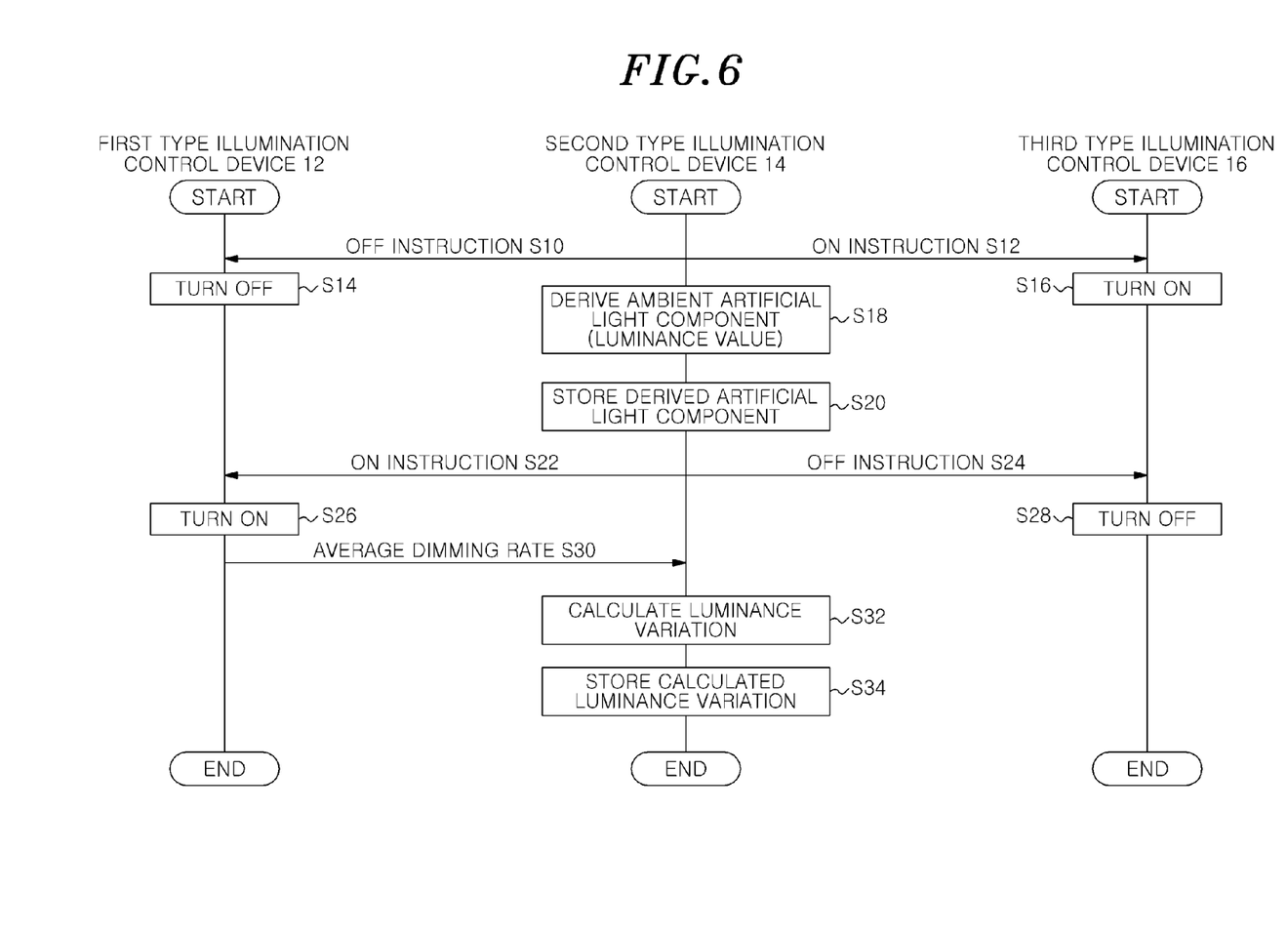
FIG. 6 is a sequence diagram showing a procedure of a preparation process in the illumination system of FIGS. 1 and 2.

The operation of the illumination system 100 having the above configuration will be described. FIG. 6 is a sequence diagram showing a procedure of the preparation process in the illumination system 100. The second type illumination controller 14 transmits the OFF instruction to the first type illumination controller 12 (S10), and transmits the ON instruction to the third type illumination controller 16 (S12). The first type illumination controller 12 turns off the illumination apparatuses 10 (S14), and the third type illumination controller 16 turns on the other illumination apparatuses 10 (S16). The second type illumination controller 14 derives the ambient artificial light component (luminance value) (S18), and stores the derived artificial light component (S20).

The second type illumination controller 14 transmits the ON instruction to the first type illumination controller 12 (S22), and transmits the OFF instruction to the third type illumination controller 16 (S24). The first type illumination controller 12 turns on the illumination apparatuses 10 (S26), and the third type illumination controller 16 turns off the other illumination apparatuses 10 (S28). The first type illumination controller 12 sends back the average dimming rate to the second type illumination controller 14 (S30). The second type illumination controller 14 calculates the luminance variation (S32), and stores the calculated luminance variation (S34).

Figure 7:
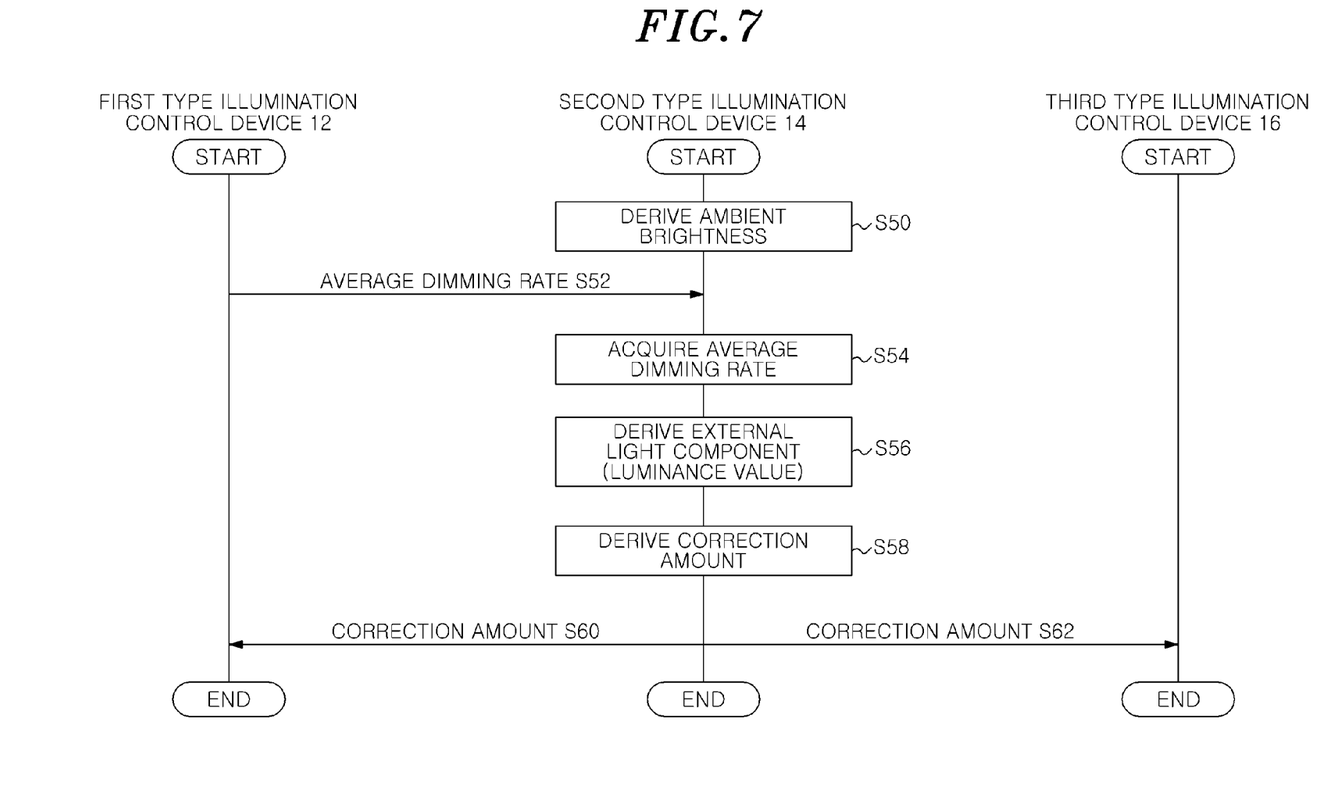
FIG. 7 is a sequence diagram showing a procedure of a control process in the illumination system of FIGS. 1 and 2.

FIG. 7 is a sequence diagram showing a procedure of the control process in the illumination system 100. The second type illumination controller 14 derives ambient brightness (S50). The first type illumination controller 12 transmits the average dimming rate to the second type illumination controller 14 (S52), and the second type illumination controller 14 acquires the average dimming rate (S54). The second type illumination controller 14 derives the external light component (luminance value) (S56). The second type illumination controller 14 derives the correction amount (S58). The second type illumination controller 14 transmits the correction amount to the first type illumination controller 12 (S60), and transmits the correction amount to the third type illumination controller 16 (S62).

Figure 8:
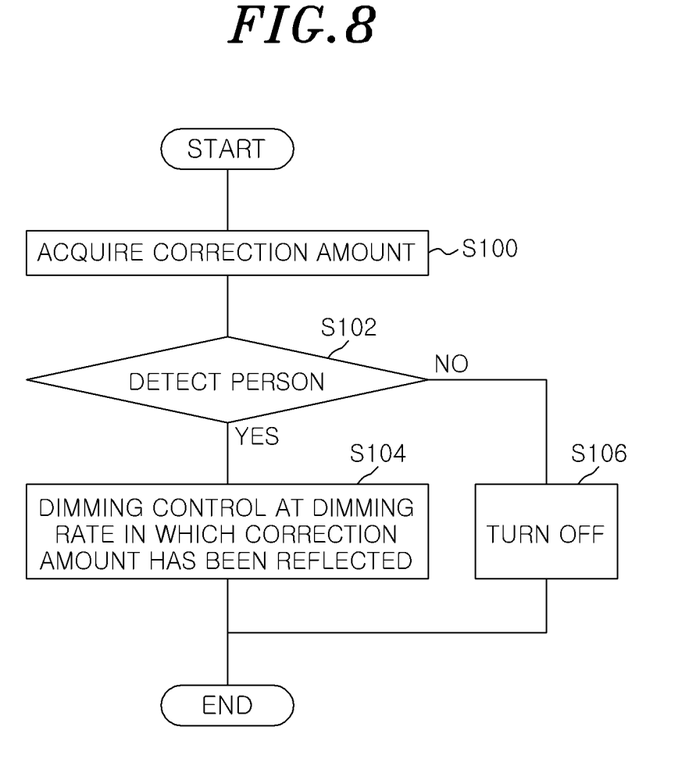
FIG. 8 is a flowchart showing a procedure of the dimming control using the first type illumination controller.

FIG. 8 is a flowchart showing a procedure of the dimming control using the first type illumination controller 12. The control unit 46 acquires the correction amount via the first communication unit 52 (S100). If a person is detected in the image processing unit 42 ("Y" in S102), the control unit 46 executes the dimming control on the illumination apparatuses 10 at the dimming rate in which the correction amount has been reflected (S104). If a person is not detected in the image processing unit 42 ("N" in S102), the control unit 46 turns off the illumination apparatuses 10 (S106).

According to the embodiment of the present invention, since the illumination controller for human detection and the illumination controller for brightness detection are configured separately, the detection of the presence of a person and the detection of the brightness may be performed at an arbitrary timing. In addition, since the detection of the presence of a person and the detection of the brightness are performed at an arbitrary timing, the dimming can be finely controlled. Further, since the dimming is finely controlled, it is possible to improve the comfort and energy saving performance. Moreover, since a correction value is determined by the processing between the paired controllers, it is possible to suppress the complexity of processing even if two controllers are included. Further, since the third type illumination controller which is not paired with the second type illumination controller receives the correction amount from the second type illumination controller and controls the dimming, the processing can be simplified.

Further, since the external light component is derived by subtracting the ambient artificial light component acquired in the preparation process, a suitable correction value can also be derived with respect to the third type illumination controller which is not paired with the second type illumination controller. In addition, if the amount of external light from the ambient illumination apparatuses and natural light is large as compared with the case of the preparation process, the large groups are dimming-controlled collectively. However, since the brightness level is corrected only for the illumination apparatuses of the small group in which it is determined that a person is present, it is possible to improve the comfort and energy saving performance.

The summary of one aspect is as follows.

An illumination control system according to one aspect of the present invention comprises:

the first type illumination controller 12 which detects presence of a person in an illumination space to be illuminated by an illumination apparatus 10, the illumination apparatus 10 being connectable to the first type illumination controller 12; and the second type illumination controller 14 which detects brightness in the illumination space, the second type illumination controller 14 being connected to the first type illumination controller 12.

The second type illumination controller 14 derives the degree of dimming based on the detected brightness, and notifies the degree of dimming to the first type illumination controller 12.

Upon detecting the presence of a person, the first type illumination controller 12 controls the dimming of the illumination apparatus 10 according to the degree of dimming notified from the second type illumination controller 14.

The illumination control system may further comprise the third type illumination controller 16 which detects presence of a person in another illumination space to be illuminated by another illumination apparatus 10, the another illumination apparatus 10 being connected to the third type illumination controller 16, the third type illumination controller 16 being connected to the second type illumination controller 14, and the another illumination apparatus 10 being different from the illumination apparatus 10.

The second type illumination controller 14 notifies the degree of dimming to the third type illumination controller 16.

Upon detecting the presence of a person, the third type illumination controller 16 may control the dimming of the another illumination apparatus 10 according to the degree of dimming notified from the second type illumination controller 14.

The second type illumination controller 14 may comprise:

the image sensor 60 configured to capture the illumination space;

the first acquiring unit 76 which acquires a captured image from the image sensor 60;

the first deriving unit 78 which derives a luminance value as the brightness in the illumination space from the captured image acquired by the first acquiring unit 76;

the second acquiring unit 80 which acquires a dimming rate of the illumination apparatus 10 whose dimming is controlled by the first type illumination controller 12;

the storage unit 64 which stores a luminance variation when varying the dimming rate of the illumination apparatus whose dimming is controlled by the first type illumination controller 12;

the second deriving unit 82 which derives an external light component by multiplying the luminance variation stored in the storage unit 64 by the dimming rate acquired by the second acquiring unit 80 and subtracting the multiplication result from the luminance value derived by the first deriving unit 78; and the third deriving unit 84 which derives the degree of dimming based on the external light component derived by the second deriving unit 82.

The second type illumination controller 14 may comprise:

the image sensor 60 configured to capture the illumination space;

the acquiring unit 70 for preparation which acquires a captured preparation image from the image sensor 60 when turning off the illumination apparatus 10 whose dimming is controlled by the first type illumination controller 12 and turning on another illumination apparatus 10 whose dimming is controlled by the third type illumination controller 16;

the deriving unit 72 for preparation which derives an ambient artificial light component from the captured preparation image acquired by the acquiring unit 70 for preparation;

the first acquiring unit 76 which acquires a captured image from the image sensor 60;

the first deriving unit 78 which derives a luminance value as the brightness in the illumination space from the captured image acquired by the first acquiring unit 76;

the second acquiring unit 80 which acquires a dimming rate of the illumination apparatus 10 whose dimming is controlled by the first type illumination controller 12;

the storage unit 64 which stores the ambient artificial light component derived by the deriving unit 72 for preparation and the luminance variation when varying the dimming rate of the illumination apparatus 10 whose dimming is controlled by the first type illumination controller 12;

the second deriving unit 82 which derives an external light component by multiplying the luminance variation stored in the storage unit 64 by the dimming rate acquired by the second acquiring unit 80 and subtracting the multiplication result and the ambient artificial light component stored in the storage unit 64 from the luminance value derived by the first deriving unit 78; and the third deriving unit 84 which derives the degree of dimming based on the external light component derived by the second deriving unit 82.

The illumination system 100 according to another aspect of the present invention comprises:

the illumination apparatus 10;

the first type illumination controller 12 which detects presence of a person in an illumination space to be illuminated by an illumination apparatus 10, the illumination apparatus 10 being connectable to the first type illumination controller 12; and the second type illumination controller 14 which detects brightness in the illumination space, the second type illumination controller 14 being connected to the first type illumination controller 12.

The second type illumination controller 14 derives the degree of dimming based on the detected brightness, and notifies the degree of dimming to the first type illumination controller 12.

Upon detecting the presence of a person, the first type illumination controller 12 controls the dimming of the illumination apparatus 10 according to the degree of dimming notified from the second type illumination controller 14.

An illumination control method according to still another aspect of the present invention, which is performed in an illumination control system including the first type illumination controller 12 connectable to the illumination apparatus 10 and the second type illumination controller 14 connected to the first type illumination controller 12, the method comprises:

allowing the second type illumination controller 14 to detect the brightness in the illumination space to be illuminated by the illumination apparatus 10 and derive the degree of dimming based on the detected brightness;

allowing the second type illumination controller 14 to notify the derived degree of dimming to the first type illumination controller 12; and allowing the first type illumination controller 12 to control the dimming of the illumination apparatus 10 according to the degree of dimming notified from the second type illumination controller 14 upon detecting the presence of a person in the illumination space.

Second Embodiment

The second embodiment relates to an illumination system for controlling the illumination of the illumination apparatuses similarly to the first embodiment. In the first embodiment, the first type illumination controller and the second type illumination controller are configured as the respective controllers having different functions. The second embodiment is configured as an illumination controller having both of these functions. The illumination controller operates as the first type illumination controller if it is connected to the illumination apparatuses, and operates as the second type illumination controller if it is not connected to the illumination apparatuses. The illumination system 100 and the illumination apparatuses 10 according to the second embodiment are of the same type as in FIGS. 1 to 3. In this case, a description will be given focusing on differences from the first embodiment.

Figure 9:
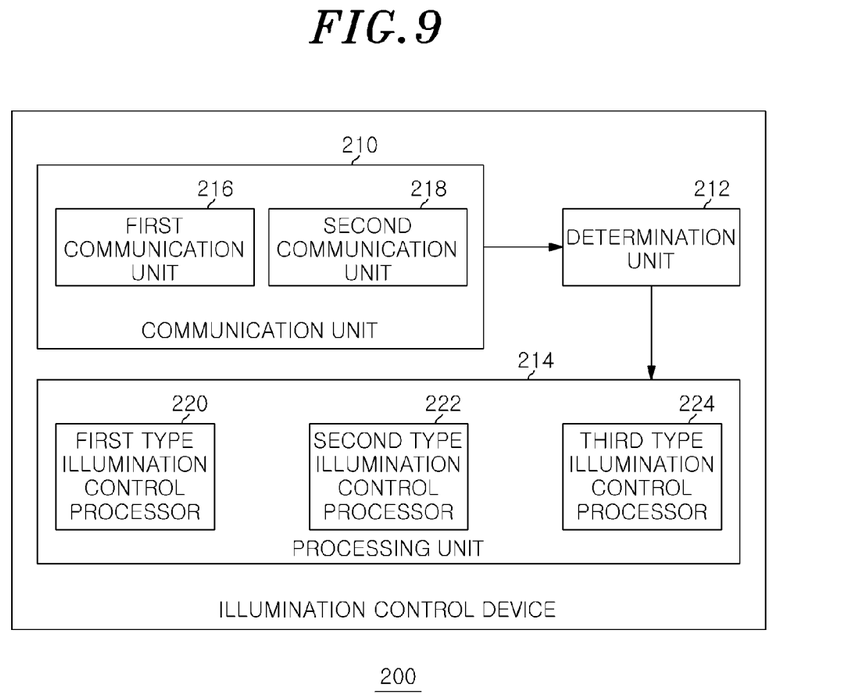
FIG. 9 shows a configuration of an illumination controller according to another embodiment of the present invention.

FIG. 9 shows a configuration of an illumination controller 200 according to the second embodiment of the present invention. The illumination controller 200 includes a communication unit 210, a determination unit 212, and a processing unit 214. Also, the communication unit 210 includes a first communication unit 216 and a second communication unit 218. The processing unit 214 includes a first type illumination control processor 220, a second type illumination control processor 222, and a third type illumination control processor 224.

The first communication unit 216 corresponds to the first communication unit 52 of FIG. 4 and the communication unit 68 of FIG. 5, and the second communication unit 218 corresponds to the second communication unit 54 of FIG. 4. The first type illumination control processor 220 and the third type illumination control processor 224 correspond to the image sensor 40, the image processing unit 42, the storage unit 44 and the control unit 46 of FIG. 4. The second type illumination control processor 222 corresponds to the image sensor 60, the image processing unit 62, the storage unit 64 and the control unit 66 of FIG. 5. The constituent elements included in the first type illumination control processor 220 to the third type illumination control processor 224 may be shared if possible. For example, the solid-state image pickup device included in the image sensor 40 and the image sensor 60 may be shared. Thus, at least the function of the first type illumination controller 12 and the function of the second type illumination controller 14 are mounted on one illumination controller 200. It is regarded as that the first type illumination controller 12 and the second type illumination controller 14 are included in (e.g., integrated into) the illumination controller 200 (e.g., common illumination controller).

The determination unit 212 checks a connection state of the communication unit 210, and selects the operation of one of the first type illumination control processor 220 to the third type illumination control processor 224 according to the connection state. If the second communication unit 218 is not connected to the dimming signal line while the first communication unit 216 is connected to the control signal line, the determination unit 212 selects the operation of the second type illumination control processor 222. In a case where the first communication unit 216 is connected to the control signal line and the second communication unit 218 is connected to the dimming signal line, if the pairing with the second type illumination controller 14 is established, the determination unit 212 selects an operation of the first type illumination control processor 220. In a case where the first communication unit 216 is connected to the control signal line and the second communication unit 218 is connected to the dimming signal line, if the pairing with the second type illumination controller 14 is not established, the determination unit 212 selects an operation of the third type illumination control processor 224. Thus, the illumination controller 200 performs a function of the first type illumination controller 12 or the third type illumination controller 16 if it is connected to the illumination apparatuses 10, and performs a function of the second type illumination controller 14 if it is not connected to the illumination apparatuses 10. It is regarded as that the illumination controller 200 (e.g., common illumination controller) functions as the first type illumination controller 12 when being connected to the illumination apparatuses 10, and functions as the second type illumination controller 14 when not being connected to the illumination apparatuses 10.

According to an embodiment of the present invention, since the functions of plural types of illumination controllers are incorporated in one illumination controller, it is possible to manufacture the illumination controller of only one type. Further, since only one type of the illumination controller is manufactured, it is possible to improve the manufacturing efficiency. Further, since the function to be executed is automatically selected depending on the connection form, it is possible to facilitate the installation.

The summary of one aspect is as follows. The function of the first type illumination controller 12 and the function of the second type illumination controller 14 are mounted on one illumination controller 200.

The illumination controller 200 may perform the function of the first type illumination controller 12 if it is connected to the illumination apparatuses 10, and may perform the function of the second type illumination controller 14 if it is not connected to the illumination apparatuses 10.

The present invention has been described based on the embodiments. The present embodiments are exemplary, and it would be understood by those skilled in the art that various modifications are possible in combinations of the constituent elements or the processing processes, and such modifications are also included in the scope of the present invention.

In the small groups 18 of the first and second embodiments, daisy chain connection has been made in which the illumination apparatuses 10 are disposed in a row from the first type illumination controller 12 or the third type illumination controller 16. However, without being limited thereto, for example, star connection may be made in which the illumination apparatuses 10 are disposed around the first type illumination controller 12 or the third type illumination controller 16. According to this modification, it is possible to improve the flexibility in the connection form.

In the first and second embodiments, wired communication is performed in the illumination system 100 by using the dimming signal line and the control signal line. However, without being limited thereto, for example, wireless communication may be used for the dimming signal line and the control signal line or either one of the dimming signal line and the control signal line. According to this modification, it is possible to improve the flexibility in the configuration of the illumination system 100.

In the first and second embodiments, the second type illumination controller 14 outputs a correction value, i.e., a relative value from a current value. However, without being limited thereto, for example, the second type illumination controller 14 may output an absolute value of the dimming ratio or the luminance value. Therefore, the absolute value and the correction value may be the degree of dimming. According to this modification, it is possible to improve the flexibility in the configuration of the illumination system 100.

In the first and second embodiments, the second deriving unit 82 uses the ambient artificial light component when deriving the external light component. However, without being limited thereto, for example, the second deriving unit 82 may not use the ambient artificial light component when deriving the external light component. According to the present embodiment, the processing can be simplified.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination control system comprising:
   a first type illumination controller which detects presence of a person in an illumination space to be illuminated by an illumination apparatus, the illumination apparatus being connectable to the first type illumination controller; and
   a second type illumination controller which detects brightness in the illumination space, the second type illumination controller being connected to the first type illumination controller, wherein the second type illumination controller derives a degree of dimming based on the detected brightness, and notifies the degree of dimming to the first type illumination controller, wherein upon detecting the presence of a person, the first type illumination controller controls dimming of the illumination apparatus according to the degree of dimming notified from the second type illumination controller, and wherein the first type illumination controller includes a first image sensor and a first image processing unit and the second type illumination controller includes a second image sensor and a second image processing unit.

2. The illumination control system of claim 1, further comprising: a third type illumination controller which detects presence of a person in another illumination space to be illuminated by another illumination apparatus, the another illumination apparatus being connected to the third type illumination controller, the third type illumination controller being connected to the second type illumination controller, and the another illumination apparatus being different from the illumination apparatus, wherein the second type illumination controller notifies the degree of dimming to the third type illumination controller, and wherein upon detecting the presence of a person, the third type illumination controller controls dimming of the another illumination apparatus according to the degree of dimming notified from the second type illumination controller.

3. The illumination control system of claim 1, wherein the second image sensor is configured to capture the illumination space, wherein the second image processing unit comprises:
a first acquiring unit which acquires a captured image from the second image sensor; and
a first deriving unit which derives a luminance value as the brightness in the illumination space from the captured image, and wherein the second type illumination controller further comprises:
a second acquiring unit which acquires a dimming rate of the illumination apparatus whose dimming is controlled by the first type illumination controller;
a storage unit which stores a luminance variation when varying the dimming rate of the illumination apparatus whose dimming is controlled by the first type illumination controller;
a second deriving unit which derives an external light component by multiplying the luminance variation stored in the storage unit by the dimming rate acquired by the second acquiring unit and subtracting a multiplication result from the luminance value derived by the first deriving unit; and
a third deriving unit which derives the degree of dimming based on the external light component derived by the second deriving unit.

4. The illumination control system of claim 2, wherein the second image sensor is configured to capture the illumination space, wherein the second image processing unit comprises:
a first acquiring unit which acquires a captured image from the second image sensor; and
a first deriving unit which derives a luminance value as the brightness in the illumination space from the captured image, and wherein the second type illumination controller further comprises:
a second acquiring unit which acquires a dimming rate of the illumination apparatus whose dimming is controlled by the first type illumination controller;
a storage unit which stores a luminance variation when varying the dimming rate of the illumination apparatus whose dimming is controlled by the first type illumination controller;
a second deriving unit which derives an external light component by multiplying the luminance variation stored in the storage unit by the dimming rate acquired by the second acquiring unit and subtracting a multiplication result from the luminance value derived by the first deriving unit; and
a third deriving unit which derives the degree of dimming based on the external light component derived by the second deriving unit.

5. The illumination control system of claim 2, the second image sensor is configured to capture the illumination space, wherein the second image processing unit comprises:
an acquiring unit for preparation which acquires a captured preparation image from the second image sensor when turning off the illumination apparatus whose dimming is controlled by the first type illumination controller and turning on the another illumination apparatus whose dimming is controlled by the third type illumination controller;
a deriving unit for preparation which derives an ambient artificial light component from the captured preparation image acquired by the acquiring unit for preparation;
a first acquiring unit which acquires a captured image from the second image sensor; and
a first deriving unit which derives a luminance value as the brightness in the illumination space from the captured image acquired by the first acquiring unit, wherein the second type illumination controller further comprises:
a second acquiring unit which acquires a dimming rate of the illumination apparatus whose dimming is controlled by the first type illumination controller;
a storage unit which stores the ambient artificial light component derived by the deriving unit for preparation and a luminance variation when varying the dimming rate of the illumination apparatus whose dimming is controlled by the first type illumination controller;
a second deriving unit which derives an external light component by multiplying the luminance variation stored in the storage unit by the dimming rate acquired by the second acquiring unit and subtracting a multiplication result and the ambient artificial light component stored in the storage unit from the luminance value derived by the first deriving unit; and
a third deriving unit which derives the degree of dimming based on the external light component derived by the second deriving unit.

6. The illumination control system of claim 1, wherein the first type illumination controller and the second type illumination controller are included in a common illumination controller, and wherein the common illumination controller functions as the first type illumination controller when being connected to the illumination apparatus, and functions as the second type illumination controller when not being connected to the illumination apparatus.

7. An illumination system comprising:
an illumination apparatus;
a first type illumination controller which detects presence of a person in an illumination space to be illuminated by an illumination apparatus, the illumination apparatus being connectable to the first type illumination controller; and
a second type illumination controller which detects brightness in the illumination space, the second type illumination controller being connected to the first type illumination controller,
wherein the second type illumination controller derives a degree of dimming based on the detected brightness, and notifies the degree of dimming to the first type illumination controller,
wherein upon detecting the presence of a person, the first type illumination controller controls dimming of the illumination apparatus according to the degree of dimming notified from the second type illumination controller, and
wherein the first type illumination controller includes a first image sensor and a first image processing unit and the second type illumination controller includes a second image sensor and a second image processing unit.

8. An illumination control method, which is performed in an illumination control system including a first type illumination controller connectable to an illumination apparatus and a second type illumination controller connected to the first type illumination controller, the method comprising:
allowing the second type illumination controller to detect brightness in an illumination space to be illuminated by the illumination apparatus and derive a degree of dimming based on the detected brightness;
allowing the second type illumination controller to notify the derived degree of dimming to the first type illumination controller; and
allowing the first type illumination controller to control dimming of the illumination apparatus according to the degree of dimming notified from the second type illumination controller upon detecting presence of a person in the illumination space,
wherein the first type illumination controller includes a first image sensor and a first image processing unit and the second type illumination controller includes a second image sensor and a second image processing unit.

* * * * *